US012301589B2

(12) United States Patent
Donbosco et al.

(10) Patent No.: US 12,301,589 B2
(45) Date of Patent: May 13, 2025

(54) INTRUSION DETECTION USING MACHINE LEARNING

(71) Applicant: Dell Products L.P., Round Rock, TX (US)

(72) Inventors: Immanuel Savio Donbosco, Chennai (IN); Prerit Pathak, Jaipur (IN); Bijan Kumar Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 691 days.

(21) Appl. No.: 17/332,346

(22) Filed: May 27, 2021

(65) Prior Publication Data

US 2022/0385674 A1    Dec. 1, 2022

(51) Int. Cl.
*H04L 9/40* (2022.01)
*G06N 5/04* (2023.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
CPC ....... H04L 63/1416; G06N 20/00; G06N 5/04
See application file for complete search history.

(56) References Cited

U.S. PATENT DOCUMENTS

| 9,654,485 B1* | 5/2017 | Neumann | H04L 63/1416 |
| 10,916,351 B1* | 2/2021 | Oh | G16Y 40/50 |
| 2022/0021695 A1* | 1/2022 | Papamartzivanos | G06N 3/088 |
| 2022/0137611 A1* | 5/2022 | Naito | G05B 23/0221 |
| | | | 706/12 |
| 2022/0385674 A1* | 12/2022 | Donbosco | H04L 63/1416 |
| 2024/0087674 A1* | 3/2024 | Gligorijevic | G16B 15/00 |

OTHER PUBLICATIONS

Zeek, "Script Reference," base/protocols/conn/main.zeek, Accessed May 7, 2021, 6 pages.
G. Saporito, "A Deeper Dive into the NSL-KDD Data Set," https://towardsdatascience.com/a-deeper-dive-into-the-nsl-kdd-data-set-15c753364657, Sep. 16, 2019, 7 pages.
S. Rawat et al., "Intrusion Detection Systems Using Classical Machine Learning Techniques versus Integrated Unsupervised Feature Learning and Deep Neural Network," Internet Technology Letters, Oct. 2020, 9 pages.

(Continued)

*Primary Examiner* — Abu S Sholeman
(74) *Attorney, Agent, or Firm* — Ryan, Mason & Lewis, LLP

(57) ABSTRACT

A method comprises collecting network data associated with data transmission in a computing environment. The method also comprises identifying, using one or more machine learning models, at least one intrusion type affecting the computing environment. The identification of the at least one intrusion type is based at least in part on the collected network data. In the method, one or more remedial communications addressing the at least one intrusion type are generated, and the one or more remedial communications are transmitted to a user.

20 Claims, 12 Drawing Sheets

(56) References Cited

OTHER PUBLICATIONS

J. Juanchaiyaphum et al., "Symbolic Data Conversion Method Using the Knowledge-based Extraction in Anomaly Intrusion Detection System," Journal of Theoretical and Applied Information Technology, vol. 65, No. 3, Jul. 31, 2014, 7 pages.

V. Kumar et al, "K-Means Clustering Approach to Analyze NSL-KDD Intrusion Detection Dataset," International Journal of Soft Computing and Engineering, vol. 3, No. 4, Sep. 2013, 4 pages.

Wikipedia, "WannaCry Ransomware Attack," https://en.wikipedia.org/w/index.php?title=WannaCry_ransomware_attack&oldid=1016481123, Apr. 7, 2021, 19 pages.

Wikipedia, "Cryptovirology," https://en.wikipedia.org/w/index.php?title=Cryptovirology&oldid=1015627672, Apr. 2, 2021, 4 pages.

\* cited by examiner

| SR. NO | LABEL | ATTRIBUTE NAME | SR. NO | LABEL | ATTRIBUTE NAME | SR. NO | LABEL | ATTRIBUTE NAME |
|---|---|---|---|---|---|---|---|---|
| 1 | B | DURATION | 10 | C | HOT | 23 | T | COUNT | 32 | H | DST_HOST_COUNT |
| 2 | B | PROTOCOL_TYPE | 11 | C | NUM_FAILED_LOGINS | 24 | T | SERROR_RATE | 33 | H | DST_HOST_SRV_COUNT |
| 3 | B | SERVICE | 12 | C | LOGGED_IN | 25 | T | RERROR_RATE | 34 | H | DST_HOST_SAME_SRV_RATE |
| 4 | B | SRC_BYTES | 13 | C | NUM_COMPROMISED | 26 | T | SAME_SRV_RATE | 35 | H | DST_HOST_DIFF_SRC_RATE |
| 5 | B | DST_BYTES | 14 | C | ROOT_SHELL | 27 | T | DIFF_SRV_RATE | 36 | H | DST_HOST_SAME_SRV_PORT_RATE |
| 6 | B | FLAG | 15 | C | SU_ATTEMPTED | 28 | T | SRV_COUNT | 37 | H | DST_HOST_SRV_DIFF_HOST_RATE |
| 7 | B | LAND | 16 | C | NUM_ROOT | 29 | T | SRV_SERROR_RATE | 38 | H | DST_HOST_SERROR_RATE |
| 8 | B | WRONG_FRAGMENT | 17 | C | NUM_FILE_CREATIONS | 30 | T | SRV_RERROR_RATE | 39 | H | DST_HOST_SRV_SERROR_RATE |
| 9 | B | URGENT | 18 | C | NUM_SHELLS | 31 | T | SRV_DIFF_HOST_RATE | 40 | H | DST_HOST_RERROR_RATE |
| | | | 19 | C | NUM_ACCESS_FILES | | | | 41 | H | DST_HOST_SRV_RERROR_RATE |
| | | | 20 | C | NUM_OUTBOUNDS_CMDS | | | | 42 | - | CLASS |
| | | | 21 | C | IS_HOT_LOGIN | | | | | | |
| | | | 22 | C | IS_GUEST_LOGIN | | | | | | |

*FIG. 9*  /‾900

```
import keras
from keras import layers
from keras import regularizers

#Load sample network packet data from CSV file
netpacket_df = pd.read_csv("/data/network_packet.csv")
X = netpacket_df[:,0:10]

# Scale and encode first
min_max_scaler = preprocessing.MinMaxScaler()
X_scale = min_max_scaler.fit_transform(X)

x_train, x_test = train_test_split(X_scale, test_size=0.3)

# Add a Dense layer with a L1 activity regularizer. =
# This is done to add a sparsity constraint
encoded = layers.Dense(encoding_dim, activation='relu',
            activity_regularizer=regularizers.l1(10e-5)) (X_scaled)
decoded = layers.Dense(115, activation='sigmoid') (encoded)

# Create the sparse auto encoder
autoencoder = keras.Model (X_scaled, decoded)

# Train the model by the training data
autoencoder.fit(x_train, x_train,
            epochs=50,
            batch_size=256,
```

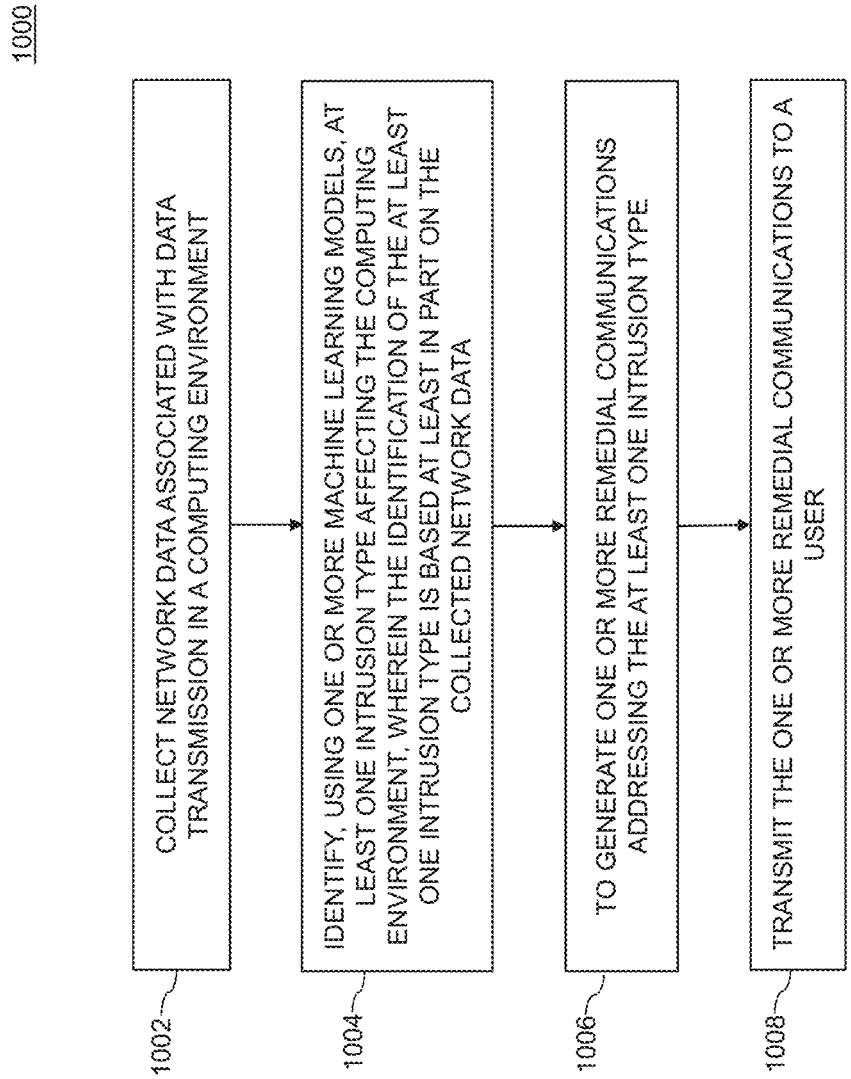

INTRUSION DETECTION USING MACHINE LEARNING

FIELD

The field relates generally to information processing systems, and more particularly to intrusion detection using machine learning (ML).

BACKGROUND

Computer malware is a tool used to exploit computer systems. The damage performed by malware can include, for example, data modification, data acquisition and exposure to spying on operations of the computer systems. Additionally, hackers may add malware to a compromised system and/or utilize resources of the system for their own activities. Exposure to malware on a computer system may result in the theft of valuable data such as, for example, passwords and personally identifiable information (PII).

Cryptovirology relates to the use of cryptography in connection with the design of malicious software. With the growth of cryptovirology, ransomware and other types of attacks have become common, yet powerful ways to perform malicious actions on vulnerable computing systems. While there may be some mechanisms in place to prevent unauthorized system attacks, there is a need for improved techniques to protect computing systems from malicious activities.

SUMMARY

Illustrative embodiments provide techniques to use machine learning in connection with an intrusion detection system.

In one embodiment, a method comprises collecting network data associated with data transmission in a computing environment. The method also comprises identifying, using one or more machine learning models, at least one intrusion type affecting the computing environment. The identification of the at least one intrusion type is based at least in part on the collected network data. In the method, one or more remedial communications addressing the at least one intrusion type are generated, and the one or more remedial communications are transmitted to a user.

These and other illustrative embodiments include, without limitation, methods, apparatus, networks, systems and processor-readable storage media.

BRIEF DESCRIPTION OF THE DRAWINGS

FIG. 4 depicts example training data for intrusion classification according to an illustrative embodiment.

FIG. 9 depicts example pseudocode for generation and training of a sparse autoencoder according to an illustrative embodiment.

FIG. 10 depicts a process for classifying computing environment attacks and recommending remedial measures according to an illustrative embodiment.

DETAILED DESCRIPTION

Figure 1:
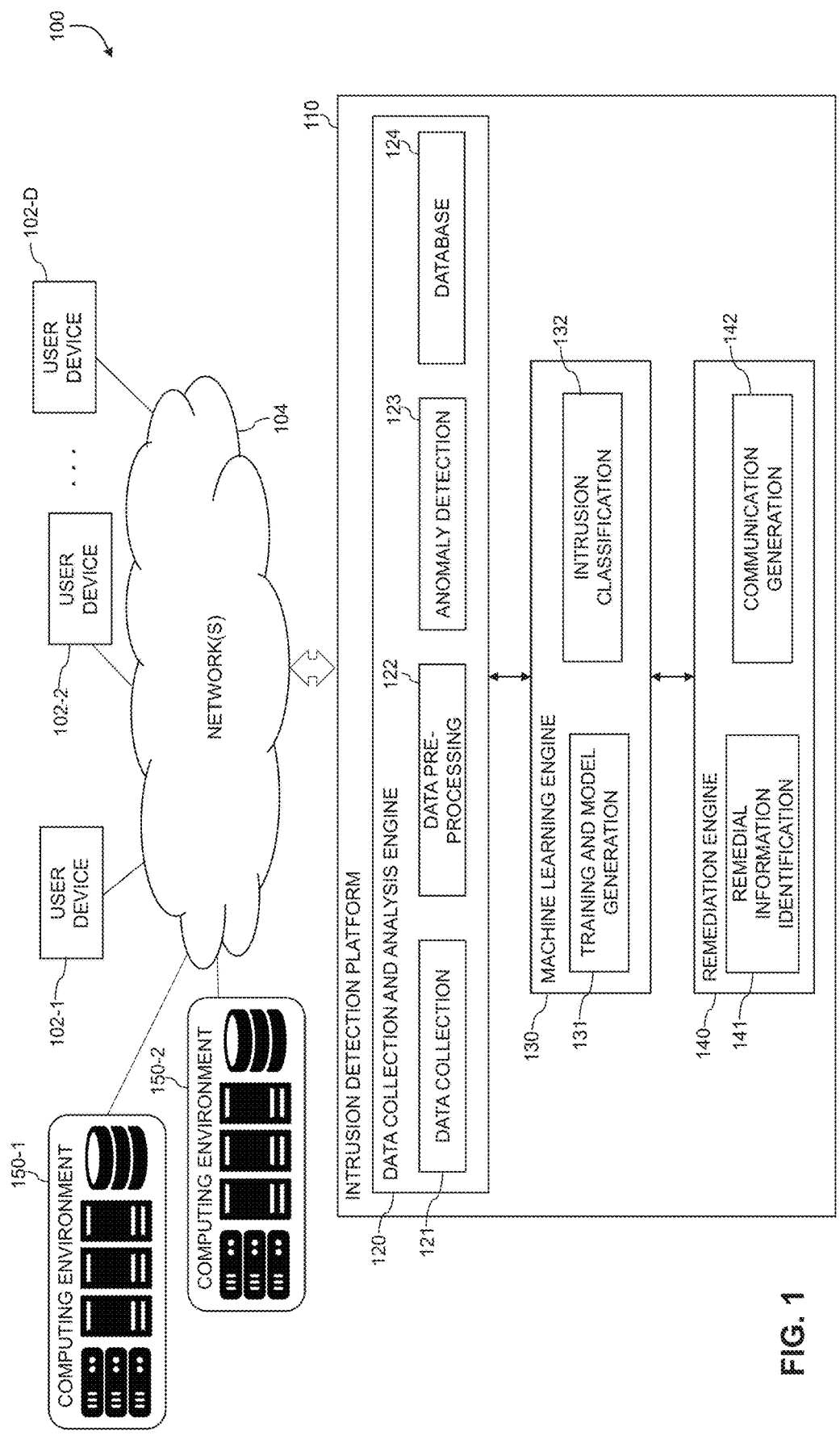
FIG. 1 depicts details of an information processing system with an intrusion detection platform for classifying computing environment attacks and recommending remedial measures according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Illustrative embodiments provide techniques to use machine learning to provide an intrusion detection system which leverages data from a network and system infrastructure and learns parametric patterns in incoming metadata. The embodiments utilize an unsupervised learning approach and deliver a classification model to predict intrusions with estimated probability. Advantageously, the intrusion detection system intercepts data packets in a network with live traffic and is trained in real-time to identify attack types and issue alerts to necessary systems and/or resources based on the identified attack types. The embodiments rely on early detection of intrusions to commence required mitigation steps in sufficient time to control and stop attacks.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with an intrusion detection platform 110.

The user devices 102 can comprise, for example, Internet of Things (IoT) devices, desktop, laptop or tablet computers, mobile telephones, or other types of processing devices capable of communicating with the intrusion detection platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as K, L, M and N are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Component data management services may be provided for users utilizing one or more machine learning models, although it is to be appreciated that other types of infrastructure arrangements could be used. At least a portion of the available services and functionalities provided by the intrusion detection platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the intrusion detection platform 110, as well as to support communication between the intrusion detection platform 110 and connected devices (e.g., user devices 102) and/or other related systems and devices not explicitly shown.

Users may refer to customers, clients and/or administrators of computing environments for which anomalies are being analyzed and addressed. For example, in some embodiments, the user devices 102 are assumed to be associated with repair technicians, system administrators, information technology (IT) managers, software developers release management personnel or other authorized personnel configured to access and utilize the intrusion detection platform 110.

The information processing system 100 further includes computing environment 150-1 and 150-2 (collectively "computing environments 150") connected to the user devices 102 and to the intrusion detection platform 110 via the network 104. The computing environments 150 comprise components such as, for example, servers, switches, storage arrays, storage devices (e.g., hard disk drives (HDDs)), routers, controllers, ports, port connectors, host bus adaptors (HBAs), buses (e.g., serial buses), etc., which are connected over one or more networks like network 104 and/or through direct wired connections. A computing environment may be any type of architecture comprising multiple components and devices, which may be connected to each other over one or more networks and/or through direct wired connections. Although two computing environments 150-1 and 150-2 are shown, the embodiments are not necessarily limited thereto, and more or less computing environments 150 may be part of the information processing system 100.

The intrusion detection platform 110 uses one or more machine learning techniques to provide a framework for intrusion detection that includes: (i) a computing environment analysis phase; (ii) a deep learning phase; and (iii) a remediation phase. In the computing environment analysis phase, network metadata and connection parameters are monitored and analyzed for any anomalies, and data corresponding to detected anomalies is sent to a machine learning engine for further processing. In the deep learning phase, parameters from the computing environment analysis phase are fed to a deep neural network and used to categorize the intrusions (also referred to herein as "attacks") for mitigation. In the remediation phase, the framework proactively alerts users (e.g., administrators) about the type of attack, and provides recommended remedial measures to reduce the impact of and/or end the attack, and prevent future attacks.

The intrusion detection platform 110 in the present embodiment is assumed to be accessible to the user devices 102, and vice-versa, over the network 104. In addition, the intrusion detection platform 110 and the user devices 102 can access the computing environments 150 over the network 104. The network 104 is assumed to comprise a portion of a global computer network such as the Internet, although other types of networks can be part of the network 104, including a wide area network (WAN), a LAN, a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The intrusion detection platform 110, on behalf of respective infrastructure tenants each corresponding to one or more users associated with respective ones of the user devices 102, provides a platform for classifying computing environment attacks and recommending remedial measures.

Referring to FIG. 1, the intrusion detection platform 110 comprises a data collection and analysis engine 120, a machine learning engine 130 and a remediation engine 140. The data collection and analysis engine 120 includes a data collection layer 121, a data pre-processing layer 122, an anomaly detection layer 123 and a database 124. The machine learning engine 130 includes a training and model generation layer 131 and an intrusion classification layer 132. The remediation engine 140 includes a remedial information identification layer 141 and a communication generation layer 142.

According to one or more embodiments, the data collection layer 121 collects network data associated with data transmission from the computing environments 150. The data collection layer 121 is configured to intercept data packets comprising metadata corresponding to live data transmission in the computing environments 150. As used herein, "live data transmission" is to be broadly construed to refer to data transmission that is in progress between at least two nodes in a computing environment. The collected network data may be stored in one or more databases 124. In an embodiment, the data collection layer 121 is integrated with one or more of the computing environments 150. The data collection layer 121 may have access to the computing environments 150 using one or more application programming interface protocols such as, for example, Redfish® representational state transfer (REST) protocol.

The network data comprises, for example, connection data, traffic data and/or content data. According to one or more embodiments, the network data is derived from communications protocol (e.g., Transmission Control Protocol/Internet Protocol (TCP/IP)) connections, traffic features accumulated over one or more time periods and content features extracted from application layer data specifying connections, communications protocols and interface methods used by hosts in a communications network. The network data further comprises one or more indications of, for example, protocol type (e.g., Hypertext Transfer Protocol (HTTP), Hypertext Transfer Protocol Secure (HTTPS), Internet Control Message Protocol (ICMP), etc.), service type (e.g., File Transfer Protocol (FTP), Simple Mail Transfer Protocol (SMTP), private, etc.) and one or more connection status flags (e.g., normal establishment and termination (SF), connection attempt rejected (REJ), connection established, originator aborted (RSTO), etc.).

In one or more embodiments, the network data collected by the data collection layer 121 comprises the same or similar data as the data in the Network Security Laboratory-Knowledge Discovery in Database (NSL-KDD) dataset or portions thereof. The dataset includes 41 features that are derived from the communication protocol connections, traffic features and content features described above. The 41 features are divided into 34 continuous features, four binary features, and three symbolic features. The three symbolic features include the protocol type, service type and connection status flags described above, which are further divided into 64 sub-features for protocol type, three sub-features for service type and 11 sub-features for connection status flags. The total number of features in the collected data, therefore, can be (34+4+64+3+11)=116. According to one or more embodiments, data pre-processing layer 122 encodes the symbolic features using encoding techniques such as, for example, one-hot encoding to differentiate the symbolic features from other features from the same category. The dataset contains 41 features and 22,545 data points. When the three categorical features are expanded by the data pre-processing layer 122 using a 1-n encoding, the total features amount to 116. A num_access_files parameter remains null throughout the dataset. Accordingly, 115 features are input to the machine learning engine 130.

In one or more embodiments, the NSL-KDD dataset is input to the machine learning engine 130 and, more particularly, to the training and model generation layer 131, as training data. Referring to FIG. 4, the table 400 depicts a sample list of network feature attributes that are used to train the machine learning models of the machine learning engine 130 for feature learning and intrusion classification. Table 400 comprises a sample of the attributes that can be used to the train the machine learning models in identifying the threats (e.g., attacks/intrusions) and classifying intrusion type. The table 400 does not necessarily comprise a complete list of training data that can be used to train the machine learning models of the machine learning engine 130.

The intrusion detection platform 110 advantageously prevents bias, false positives and false negatives that may be generated by conventional systems attempting to define system attacks. The intrusion detection platform 110 advantageously provides machine learning based categorization of different network threats such as, for example, situations where attackers attempt to mimic actual human behavior. As explained further herein, the intrusion detection platform 110 performs parameter reduction and real-time computing environment intrusion identification, making the intrusion detection platform 110 more efficient in terms of time taken for analysis and threat identification than conventional systems.

Figure 2:
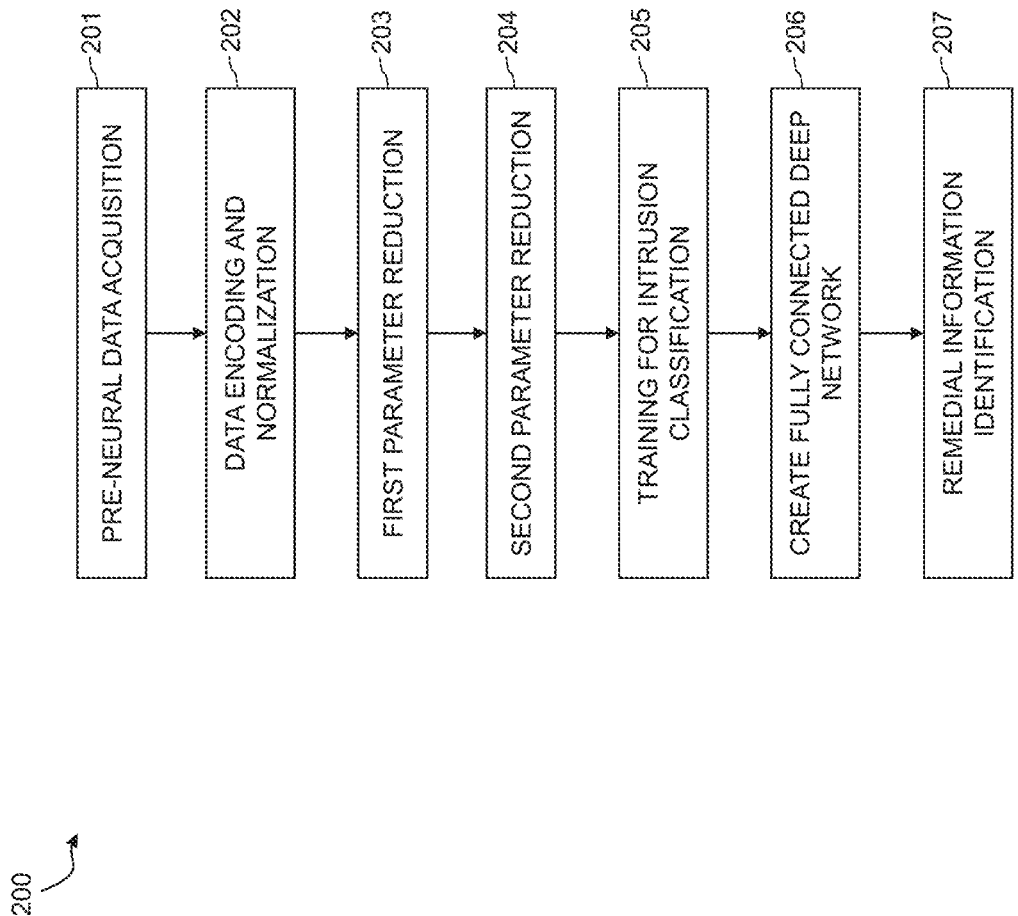
FIG. 2 depicts a process for intrusion detection and remediation according to an illustrative embodiment.
Figure 3:
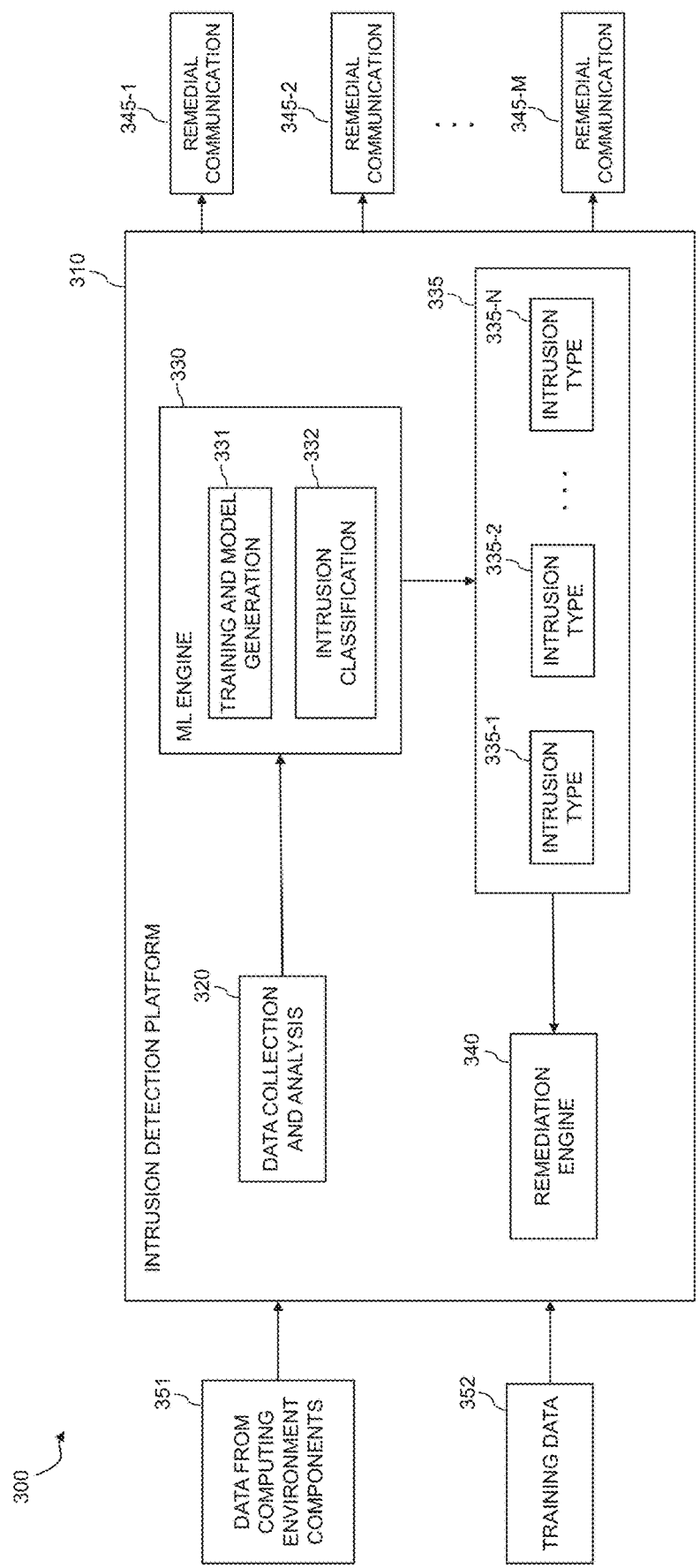
FIG. 3 depicts details of an operational flow for intrusion detection and remediation according to an illustrative embodiment.

Referring to FIGS. 1, 2 and 3, the data collection layer 121 performs pre-neural network data acquisition (block 201 of process 200). Referring to the operational flow 300 in FIG. 3, the data from the computing environment components 351 comprises, for example, network data packets comprising metadata and attributes, which are intercepted and provided to the intrusion detection platform 310 for intrusion detection prediction and analysis. The intrusion detection platform 310, data collection and analysis engine 320, machine learning (ML) engine 330 and remediation engine 340 in FIG. 3 are the same or similar to the intrusion detection platform 110, data collection and analysis engine 120, machine learning engine 130 and remediation engine 140 in FIG. 1. Referring to block 202 of FIG. 2 and as explained herein above, a data pre-processing layer 122 performs data encoding and normalization of the collected data. The data encoding and normalization 202 is performed on data collected from actual computing environments 150 (e.g., data 351) so that the machine learning models of the machine learning engine 130/330 can perform real-time analysis and classification of actual attacks. The data encoding and normalization 202 is also performed on training datasets (e.g., training data 352) so that the training datasets may be input to the training and model generation layer 131/331 to train and generate the machine learning models. As noted herein, data pre-processing can include, for example, encoding symbolic features using encoding techniques such as, for example, one-hot encoding to differentiate the symbolic features from other features from the same category.

In one or more embodiments, the ML engine 130/330, and more particularly, intrusion classification layer 132/332 uses neural network based models to extract features and identify and classify intrusions based on detected anomalies in the data. Anomalies in the collected data may be detected by, for example, the anomaly detection layer 123 of the data collection and analysis engine 120.

The machine learning engine 130/330 and more particularly, the intrusion classification layer 132/332 utilizes, for example, a logistics regression model, to generate intrusion classifications specifying one or more intrusion types 335-1, 335-2, . . . 335-N (collectively "intrusion types 335"). A probability score specifying a probability that a predicted intrusion type is accurate is calculated for a respective one of the generated intrusion types 335. Based on the outputted intrusion types 335 of the machine learning engine 130/330, the remediation engine 140/340, and more particularly, the communication generation layer 142, generates one or more remedial communications 345-1, 345-2, . . . 345-M (collectively "remedial communications 345"), which are sent to users (e.g., computing environment administrators and/or clients) via, for example, the network 104 and user devices 102. In one or more embodiments, the remedial communications 345 comprise, for example, a name of one or more intrusion types 335, a class of the one or more intrusion types 335 and/or network location information associated with the one or more intrusion types 335. The remedial communications 345 also comprise, for example, one or more mitigation measures that may be taken by a user to curtail and/or prevent the one or more intrusion types 335. The name, class and/or network location of one or more intrusion types 335, as well as the one or more mitigation measures can be compiled and identified by, for example, the remedial information identification layer 141 of the remediation engine 140 (see also block 207 of FIG. 2).

Figure 5:
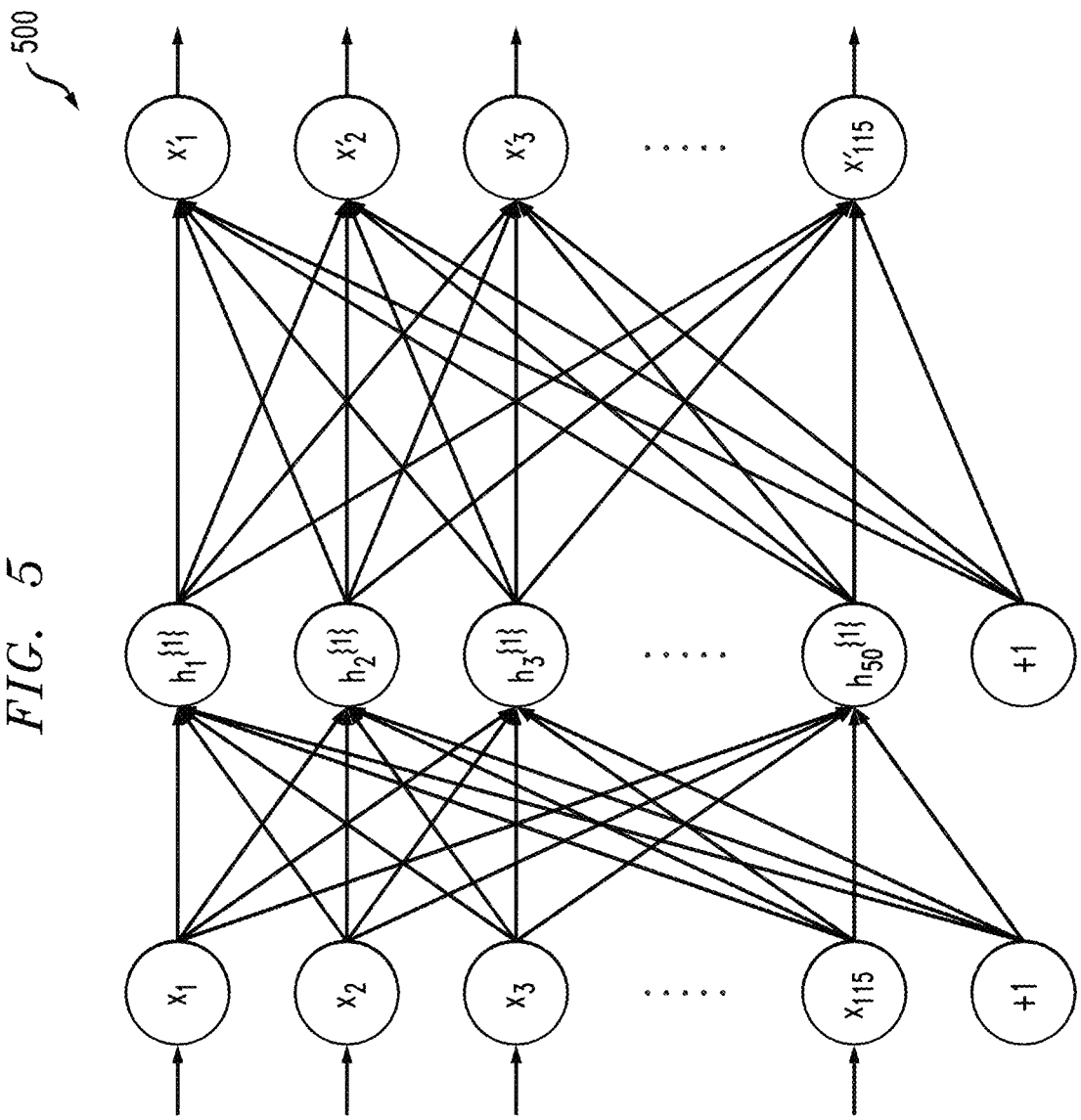
FIG. 5 depicts a first autoencoder for a first reduction of a number of computing environment features according to an illustrative embodiment.
Figure 6:
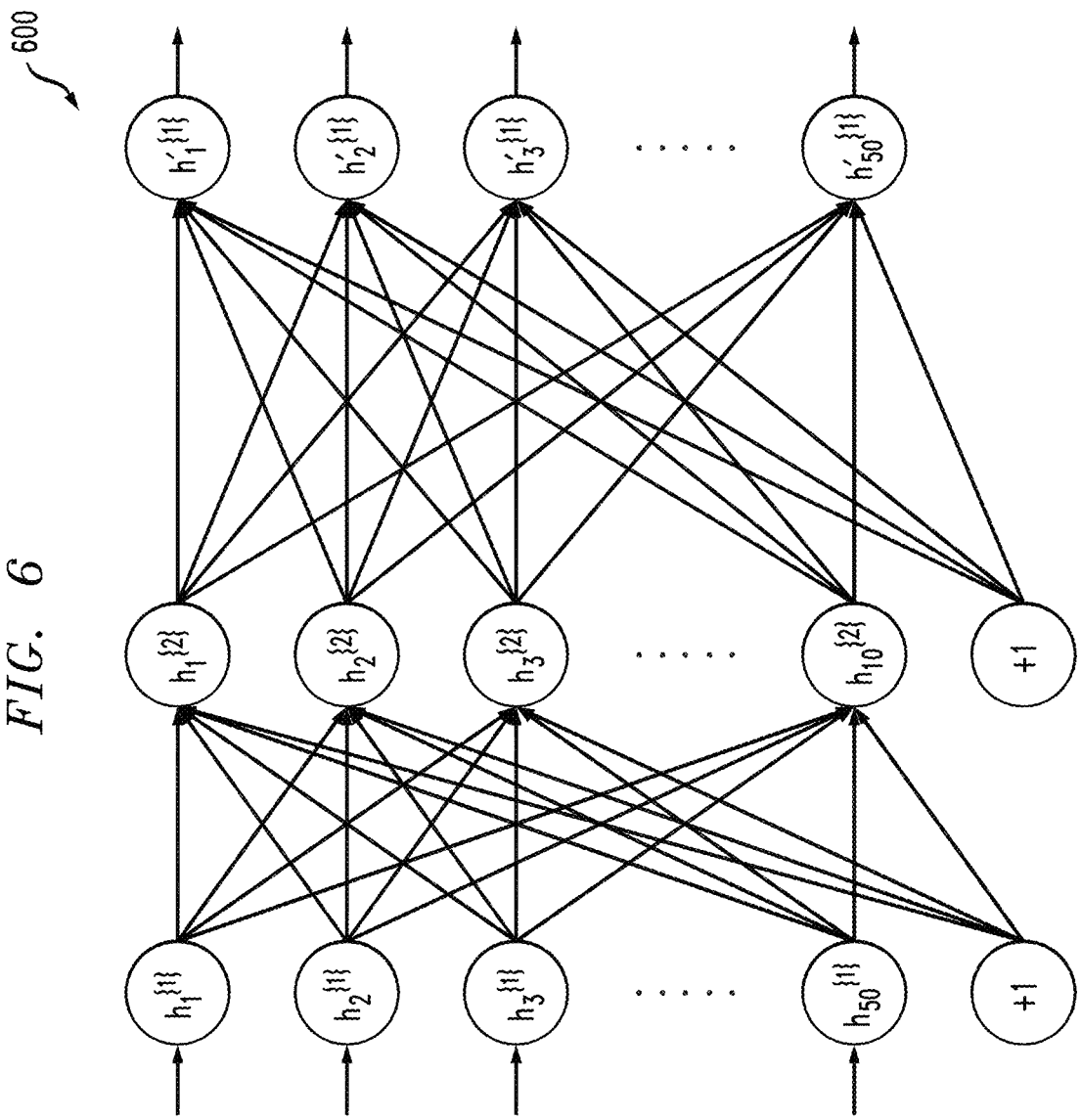
FIG. 6 depicts a second autoencoder for a second reduction of the number of computing environment features according to an illustrative embodiment.

The 116 features described herein from the NSL-KDD dataset can be used to train the machine learning models of the machine learning engine 130/330 and in connection with classifying intrusions based on actual data. As noted herein, a num_access_files parameter remains null throughout the dataset, reducing the number of features to 115. Referring to FIGS. 5 and 6, and to blocks 203 and 204 of FIG. 2, a first autoencoder 500 reduces the number of features from 115 to 50 new features and then a second autoencoder 600 subsequently reduces the number of features from 50 to 10 new features, the 10 features providing what has been determined to be a best representation of the original 116 features.

The first and second autoencoders 500 and 600 comprise, for example, sparse autoencoders to perform the dimensionality reduction and feature learning. Considering the high dimensionality of the metadata and attributes collected from the computing environments 150, the reduction of the dimensions, while keeping features intact, reduces necessary computing resources, maintains model accuracy and improves model performance (e.g., less overfitting).

The autoencoders 500 and 600 each comprise a feed-forward neural network referred to herein as an Artificial Neural Network (ANN) or Multi-Layer Perceptron (MLP). The autoencoders 500 and 600 comprise an input layer, an output layer and one or more hidden layers in between. In the autoencoders 500 and 600, the output layers have the same number of nodes as the input layer. For example, in the autoencoder 500, the first layer reduces the 115 features of the dataset down to 50 features. Then, the 50 features are expanded again to the original 115 features in the output layer.

The hidden layers of the autoencoders 500 and 600 comprise encode and decode layers and include a reduced number of nodes from the input and output layers. The hidden layers perform an approximation of principal component analysis (PCA) for dimensionality reduction and feature extraction. The autoencoders 500 and 600 attempt to inhibit neurons from firing. If the neuron fires, then the information contained in that neuron is considered a valuable parameter. The autoencoders 500 and 600 include, for example, three layers, the input layer, the hidden layer or the bottleneck, and the output layer. The input layer includes the original features, the hidden layer or the bottleneck layer includes the reduced number of features. The new features from the hidden layer are fed as input to an ANN classifier.

In an Input-Hidden-Output layer model where the output layer comprises the same parameters as the input parameters, dimensions are considerably reduced in the hidden layer. The autoencoders 500 and 600 use a stochastic conjugate gradient for error minimization with the sigmoid function as the activation function. While training sparse autoencoders (e.g., autoencoders 500 and 600), the process of optimizing the loss function involves the sum of three terms: mean Ssquared error term, L2 regularization term, and the sparsity regularization term as shown in the following equation (1).

$$E = \frac{1}{n}\sum_{n=1}^{N}\sum_{k=1}^{K}(x_{kn} - \hat{x}_{kn})^2 + \lambda * \Omega_{weights} + \beta * \Omega_{sparsity} \tag{1}$$

In equation (1), λ=coefficient for the L2 regularization term and β=coefficient for the sparsity regularization term. Referring to block 203 of FIG. 2, the first layer in the first sparse autoencoder 500 reduces the 115 features of the dataset down to 50 features. Then, the 50 features are expanded again to the original 115 features in the output layer. $X_{i(1-115)}$ denotes the input layer nodes, $h_{i(1-50)}$ represents the hidden layer nodes corresponding to the newly generated features, and $X'_{i(1-115)}$ denotes the output layer nodes.

Referring to block 204 in FIG. 2 and to FIG. 6, the second level of parameter reduction is performed by another sparse autoencoder 600, which receives as input the 50 parameters from the hidden layer of the first autoencoder 500. This sparse autoencoder 600 reduces the total number from 50 learned features to 10 new features. $h_{i(1-50)}$ denotes the input layer nodes, $h_{2i(1-10)}$ represents the hidden layer nodes corresponding to the newly generated features, and $h'_{1i(1-50)}$ denotes the output layer nodes.

Figure 7:
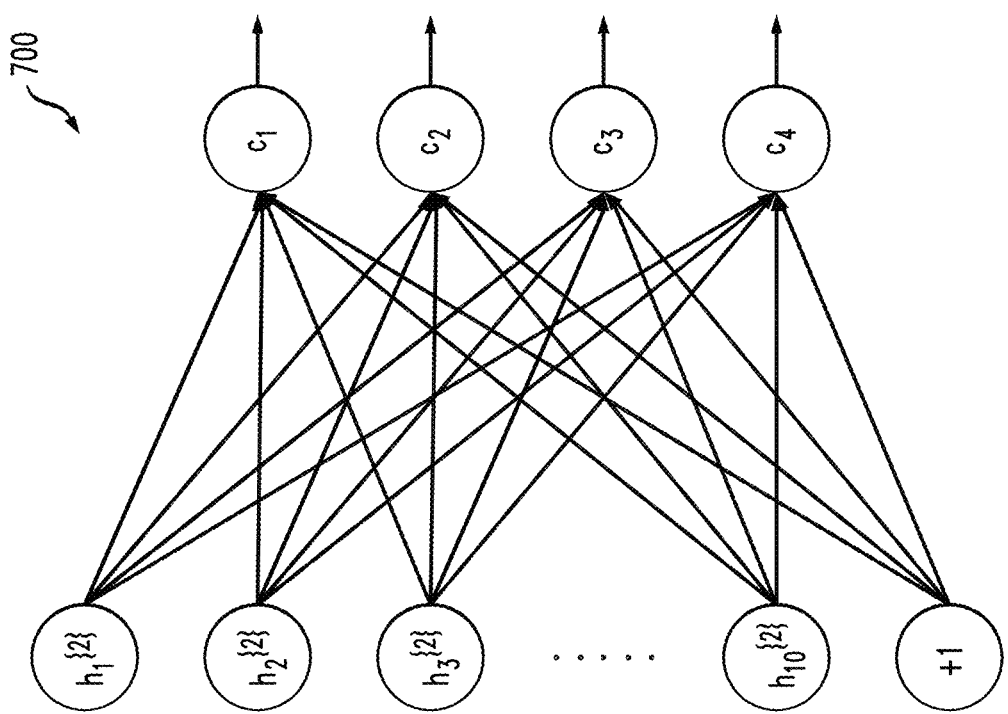
FIG. 7 depicts a multiclass logistic classifier according to an illustrative embodiment.

Referring to FIG. 7, the 10 features learned in the second autoencoder 600 are then sent to a fully connected multiclass logistic classifier 700, where the features are then classified into one of a plurality of types of intrusions. For example, according to an embodiment, the multiclass logistic classifier 700 classifies the 10 features into one of four intrusion types: Denial of Service (DOS), User to Root (U2R), Root to Local (R2L) or Probing. In FIG. 7, the four intrusion types are represented as C1, C2, C3 and C4. Referring to block 205 of FIG. 2, during a training stage, the reduced number of features from the training dataset is used to train the multiclass logistic classifier 700 to classify the intrusions. During actual operation, the reduced number of features from the collected actual data from a computing environment is input the multiclass logistic classifier 700 to classify the intrusions.

Figure 8:
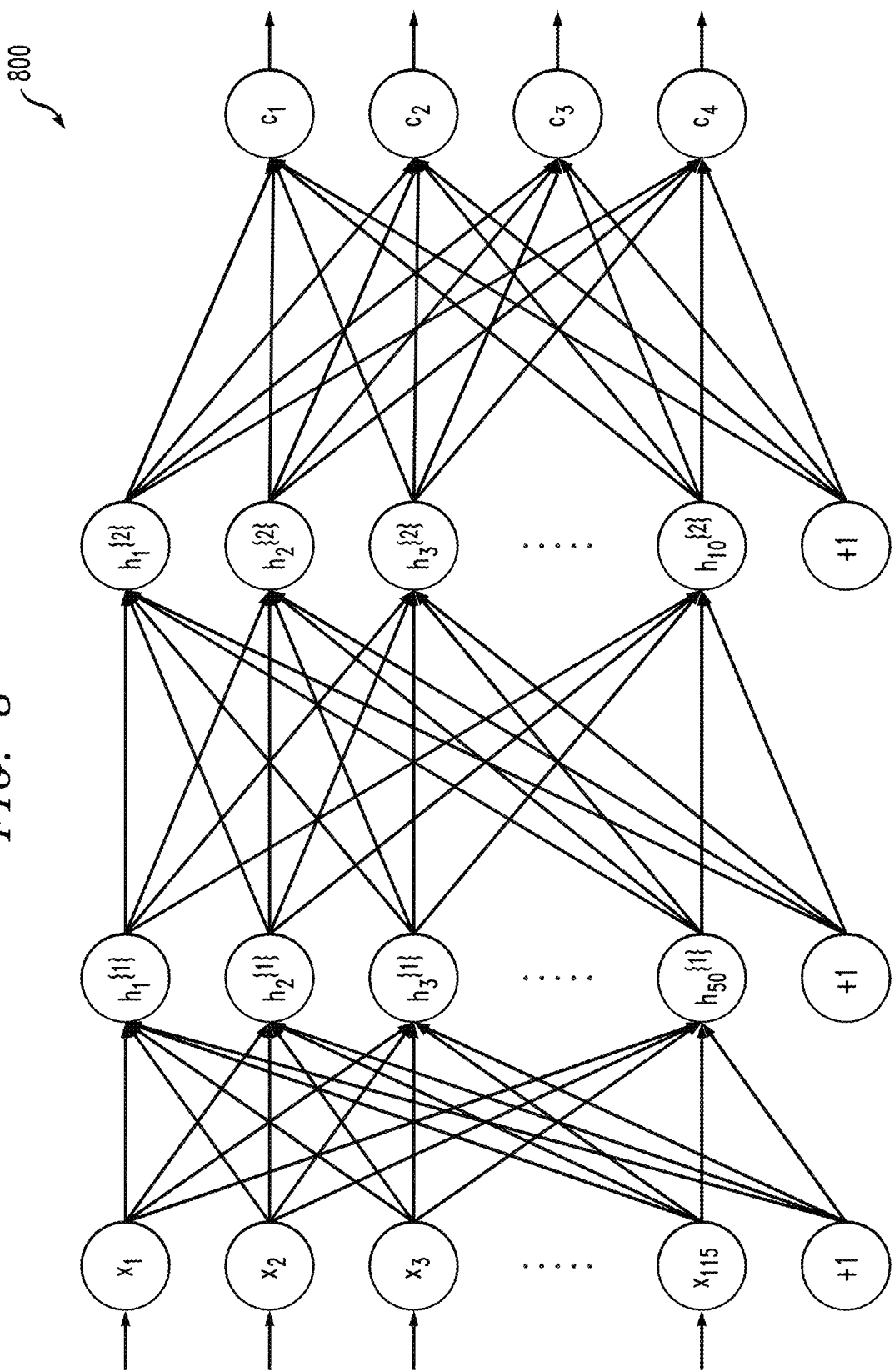
FIG. 8 depicts a fully connected network comprising the first and second autoencoders and the multiclass logistic classifier according to an illustrative embodiment.

Referring to FIG. 8 and to block 206 in FIG. 2, the fully connected neural network 800 is generated. The fully connected neural network 800, making up at least part of the intrusion classification layer 132/332, comprises the autoencoders 500 and 600 and the multiclass logistic classifier 700. The fully connected neural network 800 comprises an input layer, a parameter reducing sparse autoencoder (autoencoder 500) reducing the number of features to 50 features, a second parameter reducing autoencoder 600 reducing the number of features to 10 features and a multiclass logistic regression layer of 4 neurons (multiclass logistic classifier 700). The reduced parameters are sent to the fully connected neural network 800 which can separate or classify different intrusion types using the input parameters. The resulting classified intrusion types (e.g., intrusion types 335) are used to generate respective remedial communications (e.g., remedial communications 345), and to further train the network 800 to increase the efficiency of the fully connected neural network.

In an operational example, referring to the pseudocode 900 in FIG. 9, the NSL-KDD dataset is acquired and saved as, for example a text (.txt) or a comma-separated values (.csv) file. The saved file includes different feature attributes data including, but not necessarily limited to, protocols and other intrusion target data. This data is read, and a data frame (e.g., Pandas data frame) is generated with the network data from the file. Before using the data for training, pre-processing by the data pre-processing layer 122 is performed. The pre-processing includes, for example, checking for any null values or incomplete values and scaling of data. Scaling regularizes the data as some features with larger values might influence the machine learning models more than the features with smaller values. According to an embodiment, a MinMaxScaler is used for regularization, and handling of categorical values is performed using encoding techniques (e.g., one-hot or label encoding). In an embodiment, a neural network is created using Keras library with Tensorflow backend. As noted herein, the neural network (e.g., fully connected neural network 800) includes 115 nodes in the input layer, which then gets converted to 50 in a first hidden layer of the network, and to 10 features in a second hidden layer of the network. The first and second autoencoder 500 and 600 of the fully connected neural network 800 reduce the 115 features to 50 features, and the 50 features to 10 features, respectively. While the reductions reduce dimensions, the features remain intact since the 10 features comprise a best representation of the original 116 features. The dimension reduction reduces model complexity, while making the network efficient and accurate. In an embodiment, the network uses a Rectified Linear Unit (ReLU) activation function as the activation function that controls the firing of the neurons. The multiclass classifier 700 (e.g., multiclass logistic regression classifier) uses a Softmax activation function to classify the intrusions as one or more of 4 intrusion types (DoS, U2R, R2L, Probing). Once the intrusion types are identified, remedial communications are generated and mitigation plans are activated.

The intrusion detection platform 110/310 performs real-time packet analysis to detect anomalies. When an intrusion is classified, the remediation engine 140/340 generates remedial communications (e.g., remedial communications 345) to be transmitted to key stakeholders (e.g., computing environment administrators, owners or other users). The remedial communications comprise, for example, current intrusion information such as, for example, the exact name of an attack, an attack class and suspicious network location information (e.g., IP address(es) from where the attack may have originated). The remedial communications also comprise mitigation measures to curtail a current attack and/or prevent future attacks.

Data indicating no intrusions (e.g., no malicious activity) and data indicating intrusions (e.g., malicious activity) is sent at regular intervals to the machine learning engine 130/330 (e.g., training and model generation layer 131/331) to retrain machine learning models. The models are trained with the latest data in order to reduce the number of false positives and false negatives in the classification phase. Also, any sudden changes in the network which are not malicious, such as, for example, an increase in user number or the addition of a new server, which might increase the frequency of requests, are incorporated in the neural network by retraining the model.

According to one or more embodiments, the database 124 and other storage elements used herein can be configured according to a relational database management system (RDBMS) (e.g., PostgreSQL). Databases and/or other storage elements in some embodiments are implemented using one or more storage systems or devices associated with the intrusion detection platform 110. In some embodiments, one or more of the storage systems utilized to implement the databases and/or other storage elements comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the intrusion detection platform 110, the data collection and analysis engine 120, the machine learning engine 130 and the remediation engine 140 in other embodiments can be implemented at least in part externally to the intrusion detection platform 110, for example, as stand-alone servers, sets of servers or other types of systems coupled to the network 104. For example, the data collection and analysis engine 120, the machine learning engine 130 and the remediation engine 140 may be provided as cloud services accessible by the intrusion detection platform 110.

The data collection and analysis engine 120, the machine learning engine 130 and the remediation engine 140 in the FIG. 1 embodiment are each assumed to be implemented using at least one processing device. Each such processing device generally comprises at least one processor and an associated memory, and implements one or more functional modules for controlling certain features of the data collection and analysis engine 120, the machine learning engine 130 and/or the remediation engine 140.

At least portions of the intrusion detection platform 110 and the components thereof may be implemented at least in part in the form of software that is stored in memory and executed by a processor. The intrusion detection platform 110 and the components thereof comprise further hardware and software required for running the intrusion detection platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection and analysis engine 120, the machine learning engine 130, the remediation engine 140 and other components of the intrusion detection platform 110 in the present embodiment are shown as part of the intrusion detection platform 110, at least a portion of the data collection and analysis engine 120, the machine learning engine 130, the remediation engine 140 and other components of the intrusion detection platform 110 in other embodiments may be implemented on one or more other processing platforms that are accessible to the intrusion detection platform 110 over one or more networks. Such components can each be implemented at least in part within another system element or at least in part utilizing one or more stand-alone components coupled to the network 104.

It is assumed that the intrusion detection platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection and analysis engine 120, the machine learning engine 130, the remediation engine 140 and other components of the intrusion detection platform 110, and the elements thereof can each be implemented in the form of one or more LXCs running on one or more VMs. Other arrangements of one or more processing devices of a processing platform can be used to implement the data collection and analysis engine 120, the machine learning engine 130 and the remediation engine 140 as well as other components of the intrusion detection platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the intrusion detection platform 110 to reside in different data centers. Numerous other distributed implementations of the intrusion detection platform 110 are possible.

Accordingly, one or each of the data collection and analysis engine 120, the machine learning engine 130, the remediation engine 140 and other components of the intrusion detection platform 110 can each be implemented in a distributed manner so as to comprise a plurality of distributed components implemented on respective ones of a plurality of compute nodes of the intrusion detection platform 110.

It is to be appreciated that these and other features of illustrative embodiments are presented by way of example only, and should not be construed as limiting in any way.

Accordingly, different numbers, types and arrangements of system components such the data collection and analysis engine 120, the machine learning engine 130, the remediation engine 140 and other components of the intrusion detection platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the intrusion detection platform can be offered to cloud infrastructure customers or other users as part of FaaS, CaaS and/or PaaS offerings.

The operation of the information processing system 100 will now be described in further detail with reference to the flow diagram of FIG. 10. With reference to FIG. 10, a process 1000 for classifying computing environment attacks and recommending remedial measures as shown includes steps 1002 through 1008, and is suitable for use in the system 100 but is more generally applicable to other types of information processing systems comprising an intrusion detection platform configured for classifying computing environment attacks and recommending remedial measures.

In step 1002, network data associated with data transmission in a computing environment is collected. In collecting the network data, one or more data packets comprising metadata corresponding to a live data transmission are intercepted.

In step 1004, using one or more machine learning models, at least one intrusion type affecting the computing environment is identified. The identification of the at least one intrusion type is based at least in part on the collected network data. According to one or more embodiments, one or more anomalies in the collected network data are detected, and the identification of the at least one intrusion type is further based at least in part on the detected one or more anomalies.

In step 1006, one or more remedial communications addressing the at least one intrusion type are generated. In one or more embodiments, the identification of the at least one intrusion type and the generation of the one or more remedial communications is performed as a real-time response to the collection of the network data and/or to the detection of the one or more anomalies. In step 1008, the one or more remedial communications are transmitted to a user. The one or more remedial communications comprise, for example, a name of the at least one intrusion type, a class of the at least one intrusion type and/or network location information associated with the at least one intrusion type. The one or more remedial communications cam also comprise one or more mitigation measures to curtail and/or prevent the at least one intrusion type.

According to one or more embodiments, the collected network data comprises at least one of connection data, traffic data and content data, and further comprises one or more indications of at least one of protocol type, service type and one or more connection status flags.

In identifying the at least one intrusion type affecting the computing environment, at least a portion of the collected network data is inputted to a first autoencoder. The first autoencoder reduces dimensions of the portion of the collected network data from a first number of features to a second number of features. The second number of features are inputted to a second autoencoder, which reduces the second number of features to a third number of features. The third number of features are inputted to a multiclass logistic classifier, which classifies the third number of features into the at least one intrusion type. According to one or more embodiments, the at least one intrusion type comprises a DOS attack, a U2R attack, an R2L attack and a probing attack.

According to an embodiment, the one or more machine learning models are trained with training data comprising connection data, traffic data and/or content data. The training data may further comprise data indicating identified intrusion types and a lack of identified intrusion types corresponding to respective groupings the connection data, the traffic data and/or the content data. The dimensions of the training data may be reduced.

It is to be appreciated that the FIG. 10 process and other features and functionality described above can be adapted for use with other types of information systems configured to execute component data management services in an intrusion detection platform or other type of platform.

The particular processing operations and other system functionality described in conjunction with the flow diagram of FIG. 10 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an intrusion detection platform as disclosed herein can provide a number of significant advantages relative to conventional arrangements. For example, unlike conventional techniques, the embodiments advantageously use machine learning techniques to identify system intrusion types and to provide remedial communications to users based on the identified intrusion types. Advantageously, the embodiments provide an innovative network-based security framework that analyzes network packets and incoming traffic and utilizes machine learning and neural networks to detect security threats.

Unlike conventional techniques, the use of a neural network to learn and extract features of security threats eliminates maintenance and management of expensive and cumbersome rule-based management systems. As an additional advantage, the embodiments utilize autoencoders to reduce the dimensions of training data and actual data, while keeping features intact, thereby reducing necessary computing resources, maintaining model accuracy and improving model performance.

The embodiments advantageously provide a fully connected network of sparse autoencoders and a logistics regression (e.g., sigmoid function) classifier to detect and classify security threats (e.g., intrusions) into various categories and alert resources to perform mitigation measures. Based on the identified category of a specific threat, targeted actions can be taken for mitigation. Threats can be detected from, for example, unauthorized users who penetrate a system by exploiting legitimate user accounts, authorized users who misuse their privileges to access unauthorized parts of a system, and users who seize supervisory control to evade auditing and access controls and/or suppress audit collection.

As an additional advantage, a deep learning model is trained in real-time after an attack is detected and is trained on datasets to differentiate between positive and negative inputs (e.g., inputs and network parameters that do not result in threats and inputs and network parameters that result in threats). The embodiments replace conventional rule-based analysis with machine learning techniques to classify intrusions and provide preventive measures for the identified intrusions. The embodiments further provide a system for real-time intrusion detection that differentiates between harmful attacks and legitimate login attempts, and protects against a wide range of security-related violations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the intrusion detection platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an intrusion detection platform in illustrative embodiments. These and other cloud-based systems in illustrative embodiments can include object stores.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
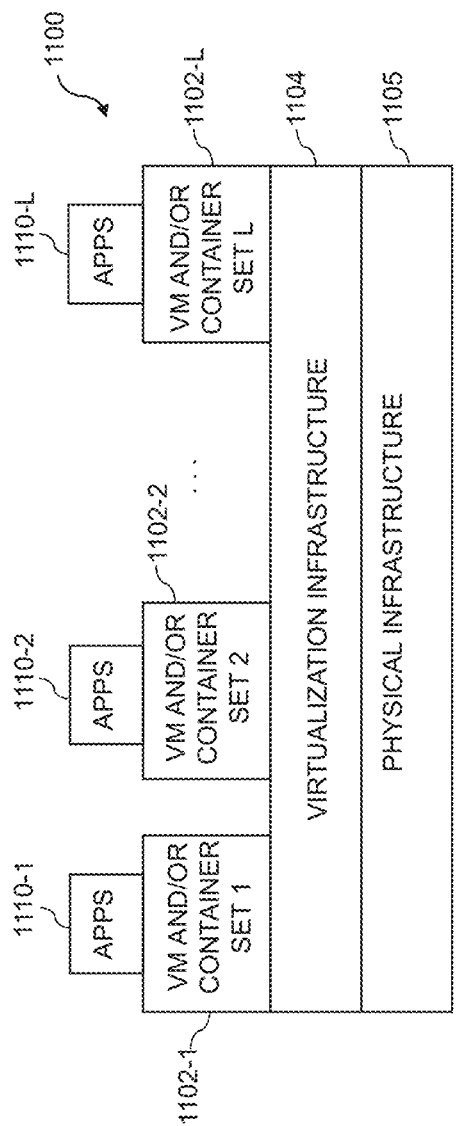
FIGS. 11 and 12 show examples of processing platforms that may be utilized to implement at least a portion of an information processing system according to illustrative embodiments.
Figure 12:
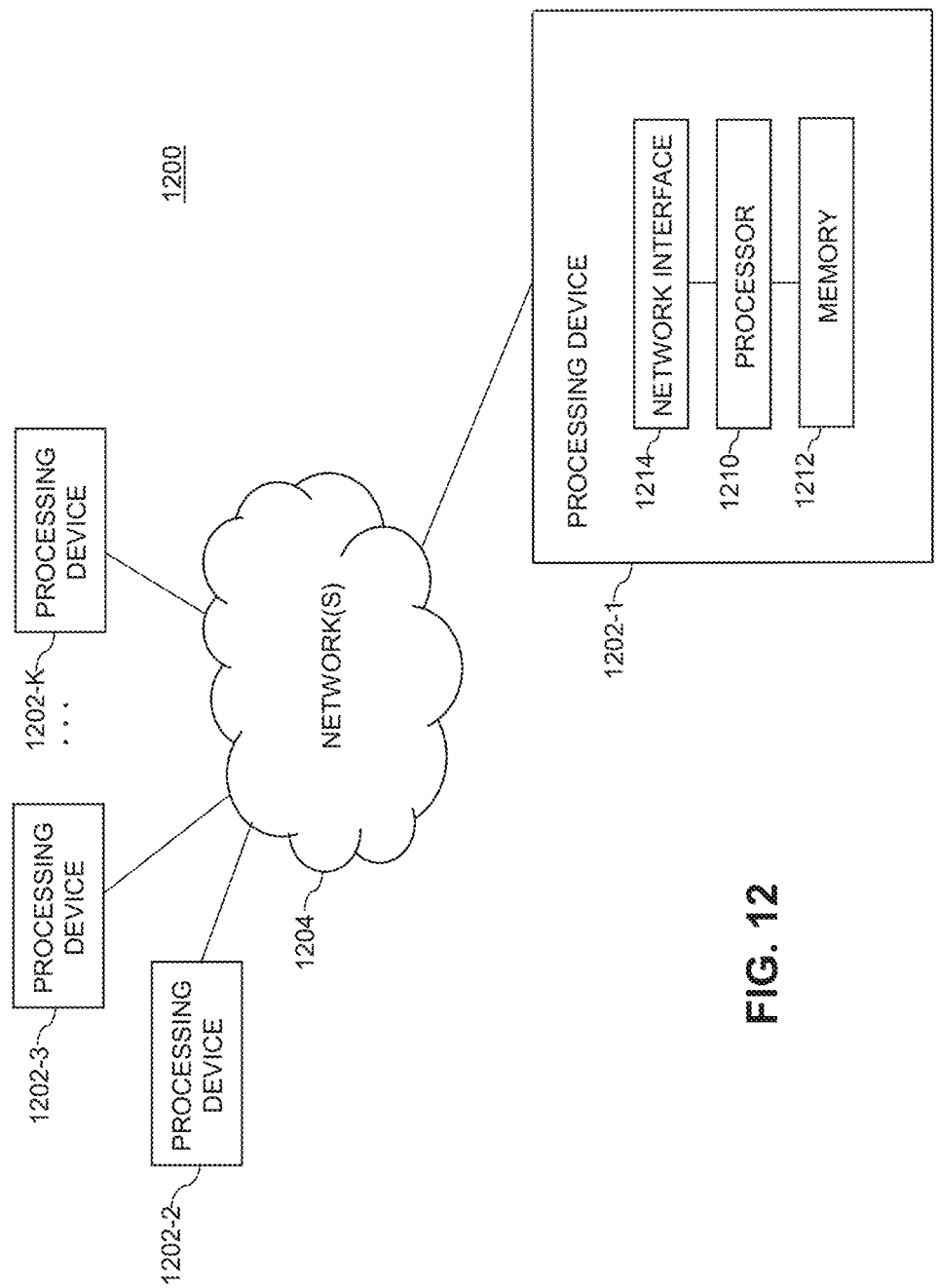

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise a converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the intrusion detection platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and intrusion detection platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processing device comprising a processor coupled to a memory;
      said at least one processing platform being configured:
         to collect network data associated with data transmission in a computing environment;
         to identify, using one or more machine learning models, at least one intrusion type affecting the computing environment, wherein the identification of the at least one intrusion type is based at least in part on the collected network data, and wherein, in identifying the at least one intrusion type affecting the computing environment, said at least one processing platform is configured:
            to input at least a portion of the collected network data to a first autoencoder, wherein the first autoencoder reduces dimensions of the portion of the collected network data from a first number of features to a second number of features and generates a first output based on the reduced dimensions; and
            to input the first output based on the reduced dimensions to a second autoencoder, wherein the second autoencoder further reduces the dimensions of the portion of the collected network data from the second number of features to a third number of features and generates a second output based on the further reduced dimensions;
         to generate one or more remedial communications addressing the at least one intrusion type; and
         to transmit the one or more remedial communications to a user;
      wherein the at least one intrusion type comprises an attack on at least a portion of the computing environment; and
      wherein the one or more machine learning models are trained at least in part with training data indicating an absence of intrusions.

2. The apparatus of claim 1 wherein said at least one processing platform is configured to perform the identification of the at least one intrusion type and the generation of the one or more remedial communications as a real-time response to the collection of the network data.

3. The apparatus of claim 1 wherein the collected network data comprises at least one of connection data, traffic data and content data.

4. The apparatus of claim 3 wherein the collected network data further comprises one or more indications of at least one of protocol type, service type and one or more connection status flags.

5. The apparatus of claim 1 wherein, in collecting the network data, said at least one processing platform is configured to intercept one or more data packets comprising metadata corresponding to a live data transmission.

6. The apparatus of claim 1 wherein the one or more remedial communications comprise at least one of a name of the at least one intrusion type, a class of the at least one intrusion type and network location information associated with the at least one intrusion type.

7. The apparatus of claim 1 wherein the one or more remedial communications comprise one or more mitigation measures to at least one of curtail and prevent the at least one intrusion type.

8. The apparatus of claim 1 wherein the training data further comprises at least one of connection data, traffic data and content data.

9. The apparatus of claim 8 wherein said at least one processing platform is configured to reduce dimensions of the training data.

10. The apparatus of claim 8 wherein the training data further indicates identified intrusion types, and wherein the identified intrusion types and the absence of intrusions correspond to respective groupings of at least one of the connection data, the traffic data and the content data.

11. The apparatus of claim 1 wherein the at least one processing platform is further configured to input to the one or more machine learning models at designated intervals updated training data indicating the absence of intrusions.

12. The apparatus of claim 1 wherein the first output comprises the second number of features and the second output comprises the third number of features.

13. The apparatus of claim 12 wherein, in identifying the at least one intrusion type affecting the computing environment, said at least one processing platform is further configured to input the third number of features to a multiclass logistic classifier, the multiclass logistic classifier classifying the third number of features into the at least one intrusion type.

14. The apparatus of claim 13 wherein the at least one intrusion type comprises one of a denial of service (DOS) attack, a user to root (U2R) attack, a root to local (R2L) attack and a probing attack.

15. A method comprising:
   collecting network data associated with data transmission in a computing environment;
   identifying, using one or more machine learning models, at least one intrusion type affecting the computing environment, wherein the identification of the at least one intrusion type is based at least in part on the collected network data, and wherein identifying the at least one intrusion type affecting the computing environment comprises:
      inputting at least a portion of the collected network data to a first autoencoder, wherein the first autoencoder reduces dimensions of the portion of the collected network data from a first number of features to a second number of features and generates a first output based on the reduced dimensions; and
      inputting the first output based on the reduced dimensions to a second autoencoder, wherein the second autoencoder further reduces the dimensions of the portion of the collected network data from the second number of features to a third number of features and generates a second output based on the further reduced dimensions;
   generating one or more remedial communications addressing the at least one intrusion type; and transmitting the one or more remedial communications to a user;

wherein the at least one intrusion type comprises an attack on at least a portion of the computing environment;

wherein the one or more machine learning models are trained at least in part with training data indicating an absence of intrusions; and wherein the method is performed by at least one processing platform comprising at least one processing device comprising a processor coupled to a memory.

16. The method of claim 15 further comprising inputting to the one or more machine learning models at designated intervals updated training data indicating the absence of intrusions.

17. The method of claim 15 wherein the first output comprises the second number of features and the second output comprises the third number of features.

18. The method of claim 17 wherein identifying the at least one intrusion type affecting the computing environment further comprises inputting the third number of features to a multiclass logistic classifier, the multiclass logistic classifier classifying the third number of features into the at least one intrusion type.

19. A computer program product comprising a non-transitory processor-readable storage medium having stored therein program code of one or more software programs, wherein the program code when executed by at least one processing platform causes said at least one processing platform:

to collect network data associated with data transmission in a computing environment;

to identify, using one or more machine learning models, at least one intrusion type affecting the computing environment, wherein the identification of the at least one intrusion type is based at least in part on the collected network data, and wherein, in identifying the at least one intrusion type affecting the computing environment, the program code further causes said at least one processing platform:

to input at least a portion of the collected network data to a first autoencoder, wherein the first autoencoder reduces dimensions of the portion of the collected network data from a first number of features to a second number of features and generates a first output based on the reduced dimensions; and to input the first output based on the reduced dimensions to a second autoencoder, wherein the second autoencoder further reduces the dimensions of the portion of the collected network data from the second number of features to a third number of features and generates a second output based on the further reduced dimensions;

to generate one or more remedial communications addressing the at least one intrusion type; and to transmit the one or more remedial communications to a user;

wherein the at least one intrusion type comprises an attack on at least a portion of the computing environment; and wherein the one or more machine learning models are trained at least in part with training data indicating an absence of intrusions.

20. The computer program product according to claim 19 wherein the first output comprises the second number of features and the second output comprises the third number of features.

* * * * *